April 14, 1970  P. CARRE ET AL  3,505,948
APPARATUS FOR MAKING TUBE-SHAPED FOOD PRODUCTS
Filed May 20, 1968  5 Sheets-Sheet 5

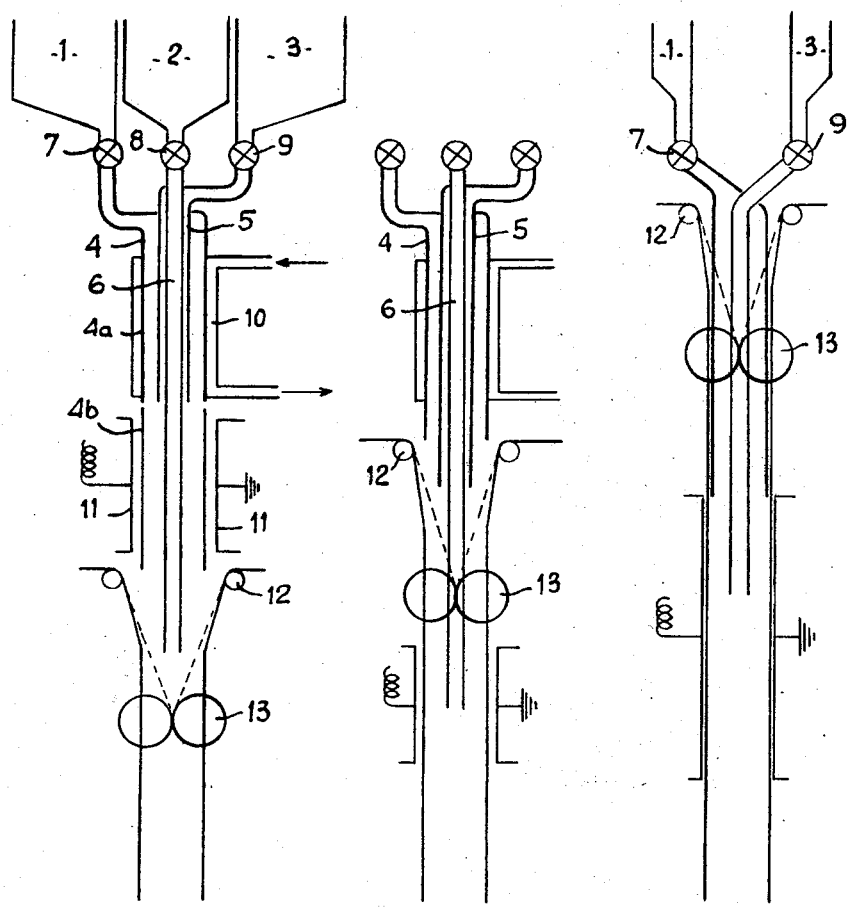

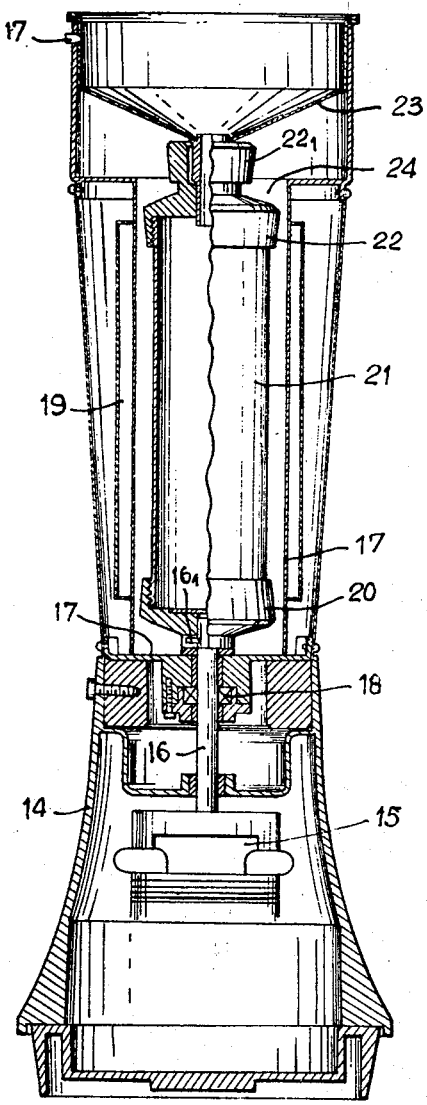

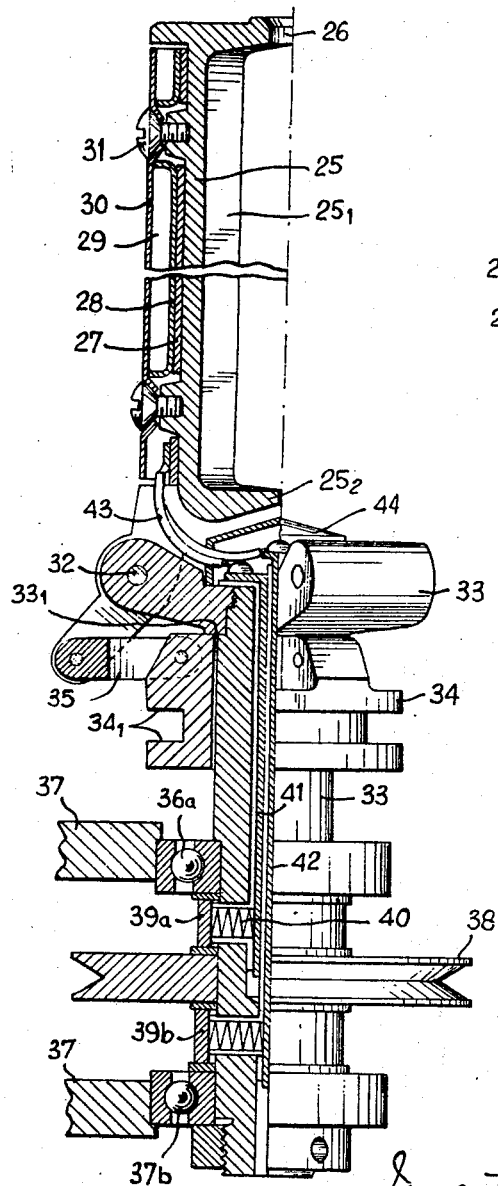
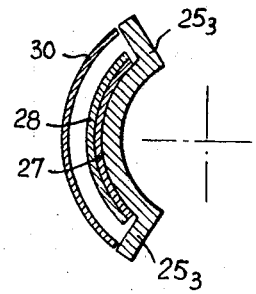

Inventors:
Pierre Carre,
Pierre Tanguy and
Jean Le Boulbouech
By Robert E. Burns
Attorney

United States Patent Office 3,505,948
Patented Apr. 14, 1970

3,505,948
APPARATUS FOR MAKING TUBE-SHAPED FOOD PRODUCTS
Pierre Carre, Pierre Tanguy, and Jean Le Boulbouech, all of 2 Rue Bodelio, 56 Lorient, France
Filed May 20, 1968, Ser. No. 730,237
Claims priority, application France, May 23, 1967, 108,308; May 8, 1968, 150,979
Int. Cl. A47j 29/00
U.S. Cl. 99—353                    4 Claims

ABSTRACT OF THE DISCLOSURE

An apparatus for preparing a food product from the major constituents of eggs, such as the white and the yolk, is described. It consists of concentric tubular conduits forming molds in which the separated constituents are passed and heated for coagulation, utilizing convection as well as dielectric heating.

---

This invention relates to a machine for making food products which have a tubular cylindrical shape.

A hard boiled egg is often used in culinary preparations either sliced or cut in quarters. Although this arcuate presentation is perfectly suitable, it has been noted that it has certain disadvantages. In effect, when cut in quarters the yellow of the egg leaves the white; when sliced, the same is also true and moreover the first and last slices only consist of egg white while those in the middle have a large proportion of yellow.

Thus, according to previous techniques, there were provided cooked eggs in which the two constituents, the white and the yellow, were separated into two cylindrical rings or co-axial cylinders. This expedient which originally had for its object simply to preserve the eggs as well as to satisfy the aesthetic tastes of the consumer, was only obtained by means of elementary devices requiring numerous manipulations. It is thus that according to a first device there were used interfitting containers defining therebetween a ring in which the white of the egg was placed and cooked until coagulation, the lower container being then removed in order to fill the inner empty cylinder with the yellow of the egg and to cook this yellow within the white.

According to another previous technique, the yellow is packaged in a plastic package and cooked therein until it coagulates and is then frozen. The plastic package is then placed in a larger container in which it is surrounded with egg white which is in its turn cooked until coagulation. Cooking can be replaced directly by freezing.

The present invention has for its object to avoid the too numerous manipulations required by the above described processes. It is concerned with machines in which the whites and the yellows of the eggs and also other possible constituents of the finished product can be simultaneously or separately introduced within the machine without in any way changing the structure of this machine during the operations except for absolutely automatic modifications. In fact the present invention relates to three modifications of the machine based upon the same operating principle; namely, one modification for home use, the other for industrial use, for example by cooperative concerns handling eggs in large quantities, and a third for restaurants and snack bars.

The industrial scale modification is particulary useful for cooperative concerns which treat eggs of a size too small to be consumed as they are. This is not noticeable of course when the eggs are presented to the consumer directly in the shape of tubes or of continuous sections of tubes.

The present invention thus has for its object a machine intended for making food products composed of at least the two constituents of an egg, characterized by the fact that it is formed by two or more concentric tubes forming cylindrical rings, surrounded by heating means, in each of which is cooked one constituent and at the extremity of which emerges the finished product.

The invention will be better understood by referring to the following description made by way of non limiting example and with the aid of the accompanying drawing in which there can be seen:

FIGURES 1, 2, and 3, which are vertical cross sectional views of the main parts of the three modifications of the machine operating by continuous cooking.

FIGURE 4 is a general, vertical, cross sectional view of the household modification operating by centrifugal action.

FIGURE 5 is a vertical cross sectional view of a tube intended for medium scale production by centrifugal action and by separate feed with its mechanical accessories.

FIGURE 6 is a partial cross sectional view taken along line *aa* of FIGURE 5.

Figure 7:
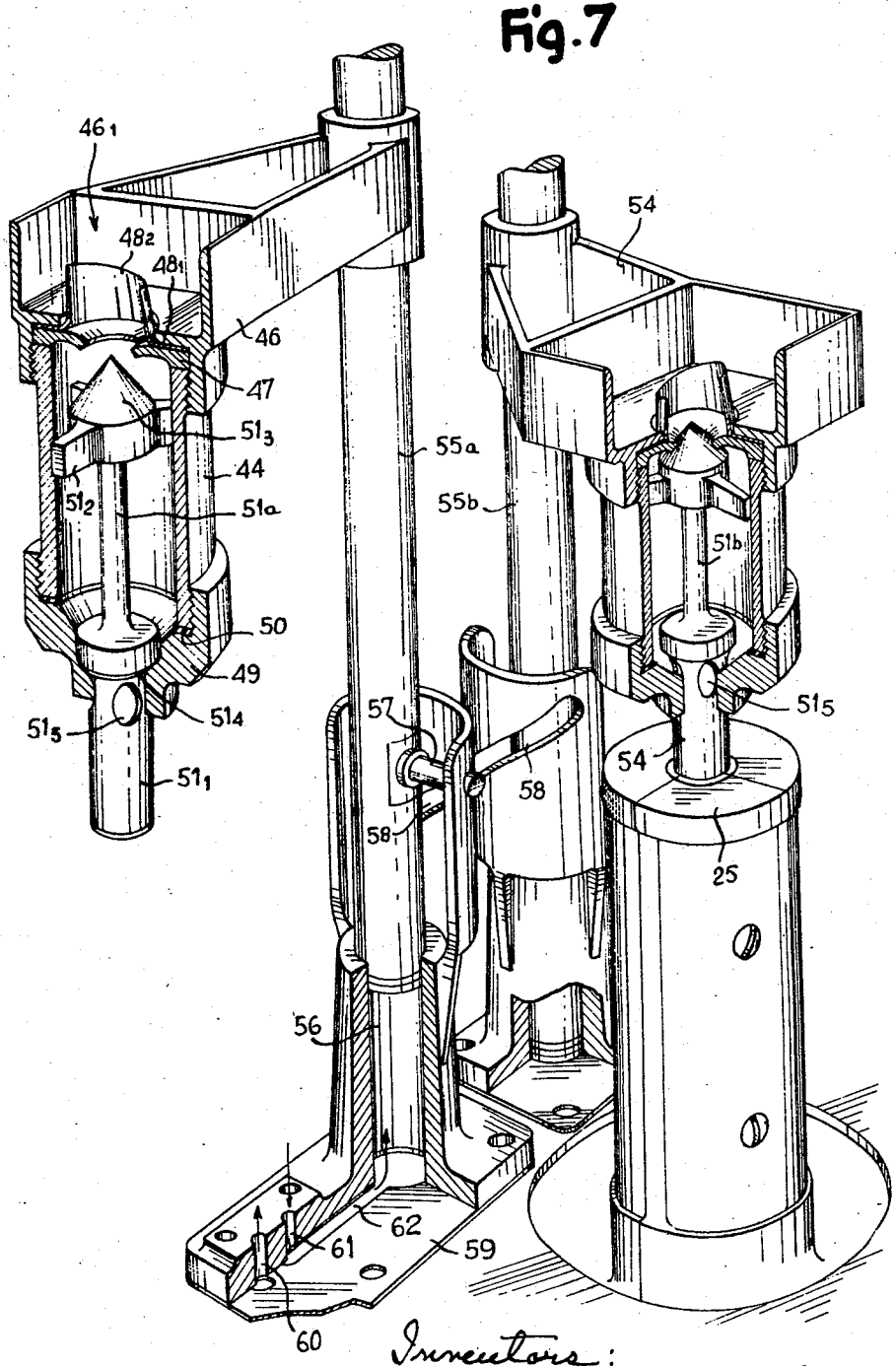
FIGURE 7 is a perspective view of the metering devices and of the centrifugal tube.

The device operating by continuous cooking will be more particularly described in connection with FIGURES 1, 2 and 3.

It suffices to have a machine resembling an extruder for moulding tubes of plastic material to achieve continuous cooking of an egg product.

The machine, preferably of the vertical type, is constituted by three hoppers 1, 2 and 3, intended to receive the white, the main culinary preparation and the yellow.

These hoppers communicate with three concentric tubes 4, 5 and 6 through pumps 7, 8 and 9 which permanently pulsate constant amounts of the product.

A convection heating envelope 10 in which circulates hot fluid surrounds outer tube 4. This tube 4 is metallic for a length which delimits a heating zone 4a. It is extended by a glass tube 4b which is surrounded by a set of electrodes 11 connected to a source of high frequency current for the purpose of dielectric heating.

Intermediate metallic tube 5 is located only in the heating zone of heating mantle 10.

Inner tube 6, entirely made of glass, extends beyond the end of the outer glass tube 4b.

Egg white, pushed by pump 7, fills the annular space comprised between tubes 4 and 5.

The yellow of the egg, pushed by pump 9, fills the annular space comprised between tubes 5 and 6.

The culinary product pushed by pump 8 fills the entire tube 6. If it is desired to obtain a hollow tube, no product is introduced in the middle hopper 2.

The flow of each pump is judiciously adjusted in order that, upon emerging from the tubes, the product speeds be identical.

Cooking of the different constituents is obtained by their residence in the heating zones. Perpendicular to heating envelope 10, the white is partially or totally cooked, and forms, at the outlet of this zone, a relatively resistant envelope. The yellow, not yet having undergone cooking during this first path, fills all the space comprised between this white envelope and central tube 6. The yellow of an egg is cooked in a second cooking zone, perpendicular to electrodes 11, where the egge white can continue to cook. At the outlet of this second cooking zone, the product contained in tube 6 invades the annular space left by the yellow.

It should be noted that if it is desired to obtain a continuous link between the different constituents, it is necessary that tubes 5 and 6 be shorter. Moreover, if the product must be presented under plastic envelope 12, the same can be applied and welded if needed by heating rollers 13, either upon leaving the second cooking zone, according to FIGURE 1, either before the second cooking according to FIGURE 2, or before the first cooking, according to FIGURE 3. These arrangements make it possible to eliminate guiding of the white zone by a rigid tube and to reduce friction.

FIGURE 2 shows a shorter central tube 6 in order that the culinary product be more adherent to the yellow, these two products coming into contact before complete cooking of the yellow.

FIGURE 3 shows a modification of the machine for the production of eggs in the form of bars, the central tube 6 being eliminated.

Instead of having pumps 7, 8 and 9 operating constantly in order to obtain a continuous product, they can be designed so as to each push a given volume in a syncopated manner (piston pump for example) for the purpose of obtaining a discontinuous product, which will have the appearance of a sausage. Under these conditions, cooking will take place when the ingredients are stopped in their annular cavities, the length of the cooking zones being a multiple of the length of each sausage.

The described example includes two different types of heating, when the same can be used for the two cooking zones. It is also possible to replace heating by fluid circulation by electric heating collars, by dielectric loss, by heating by passage in a cavity subjected to high frequency. A single cooking zone can ensure cooking of the white, then of the yellow, as shown in FIGURE 3 where high frequency heating is shown.

Finally the perpendicular sections of tubes 4, 5 and 6 can assume any shape at all, and can have outer circular contours, lines separating yellow and white in the shape of a star, and various polygonal sections.

The machine for household production by centrifugal action will be studied by referring to FIGURE 4.

This type of machine makes it possible to obtain small tubular egg products, without having much material, and without manipulating the tubes to be interfitted, and then dissassembled before continuing manufacture of the product.

The moulding is produced by successive centrifugal movement of the white and the yolk in a hot water bath.

The apparatus consists of a base 14 holding a rapid electric motor 15. The end of shaft 16 passes through the bottom of container 17 through a lip joint 18 in order to ensure the fluid tightness of the said container. The walls of this container are heated by means of an electric heating collar 19.

The end of shaft 16 has pin $16_1$ which enables it to drive the cylindrical mould in which will be cooked the eggs. This mould consists of a ring 20 fitting on the end of the motor shaft and in which screws a slightly conical metallic tube 21. The other end of the tube is closed by a second ring 22, which is journalled freely to the end of a funnel 23. This funnel is fastened by a bayonet device to the top of container 17.

Container 17 is filled with a certain quantity of water 24. When this water boils, the motor is started.

Mould 20, 21, 22 is rapidly rotated. A certain quantity of white is poured in through the funnel, for example that obtained from three eggs. This quantity is subjected to centrifugal action due to the rotation of the tube, and adheres against the walls thereof. The rotation is continued for a given time, in general 4 minutes, and measured by a timer. When coagulation time for the white has been reached, there is poured through the funnel, for example, the three yellows and rotation is continued for a given time, for example 4 minutes. The yellow adheres against the wall of white which is already solid.

The amount of white and yellow must be less than the outer volume of the mould in order that a space remains in the centre. (If it is desired to obtain a solid product, it suffices for example to introduce the whites of 4 eggs, then to stop the rotation after coagulation of the whites and before introduction of the yellows.) The latter fill practically all the space remaining in the centre of the tube of white. After which, it suffices to remove the funnel, then to extract the mould by grasping it by means of the insulating collar $22_1$, to cool it by immersing it in cold water, to unscrew the two rings 20 and 22, then to push the contents of the tube by means of a pusher.

The egg product is easily extracted owing to the conical shape of tube 24 and with the aid of a mould release agent with which it is previously coated (silicon, grease or oil, for example).

After removal, it is for example possible to introduce in the central opening a sausage, the flexibility of the egg tube sufficing to allow passage of a body larger than the central opening.

The heat reserve contained in the boiling water, the walls 17 and collar 19, make it possible to shut off heating of said collars upon introduction of the white.

Experience has shown that the coagulation times for the white and for cooking the yellow are substantially the same and are on an average 4 minutes.

It is thus possible to use a single timing device for this operation.

The embodiment of this invention which is intended for automatic shop production by centrifugal action will be described by referring to FIGURES 5, 6, 7 and 8.

This type of apparatus also uses centrifugal moulding but in a pivoted and heating mould. The operations of filling are automatized and the whites and the yellows can be obtained by breaking eggs which are not of commercially usable size while still in their shell and of which the two constituents are homogenized after separation and delivered in standard packages. These standard packages can by their design be the only ones to use this type of machine.

Designed for restaurants and snack-bars, this type of apparatus uses energy sources available in these and more particularly city water and electricity.

The apparatus consists of three distinct devices, mainly a rotating and heating mould, meters for the product and a device for automatizing the movements.

(1) The mould, FIGURE 5, is constituted by three shells 25 made of an aluminum alloy made by pressure moulding and whose inner surface 25 is polished and coated with a mould release agent such as silicon or fluorocarbonate.

Each side assumes the shape of the sectional cylinder in such a way that when the three shells are assembled bottom $25_2$ is closed and the upper part leaves an opening 26.

Assembly of the shells is perfect owing to the planing of faces $25_3$. Shielded electric resistances 27 are secured on the outer surface of each shell through a counter plate 28, a sheet of asbestos 29 and a decorative mask 30. The whole is gripped by screws 31.

Each shell is pivoted at 32 on the core 33 around which slides a ring 34. Crank pins 35 connect the arms of levers $25_4$ to ring 34. The arrangement of these members is designed so that ring 34 be brought up to form a stop on enlarged section $33_1$, crank pins 35 give to the assembly of shells 25 a force such that they are strongly applied one against the other and if ring 34 is lowered, the shells are separated from one another as a corolla.

Ring 34 receives its downward movement through a fork meshing in groove $34_1$. This fork is integral part of a hand operated lever which is not shown.

Core 33 is journalled in two rollers 36a and 36b attached to frame 37 of the machine and is rotated with the aid of pulley 38 connected by a belt to an electric motor. Bracing between pulley and rollers is effected by copper rings 39a and 39b. Springs 40 ensure electric connection to a tube 41 and a rod 42 concentric therewith and housed in the core 33.

All these parts are intended for the conveying of the electric current and are naturally insulated from one another and from metallic masses by insulating units constituted by tubes and washers made of cardboard coated with Bakelite.

Two brushes rub on rings 39 while one of the supple connections 43, feed each shell resistance. An insulating cap 44 protects the connection welds from all manual contact.

Figure 8:
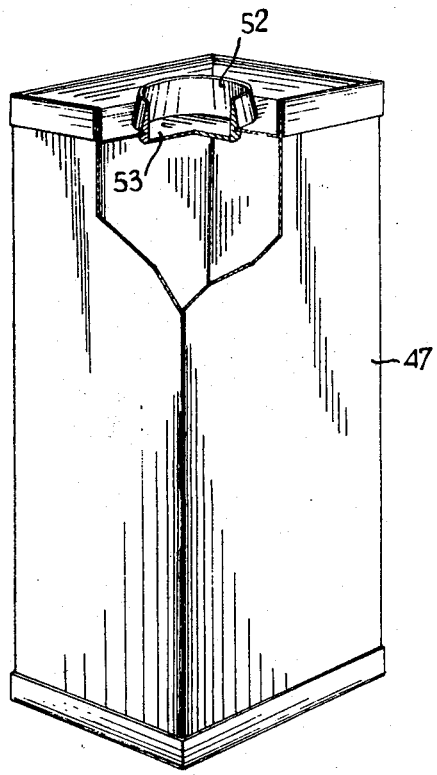
FIGURE 8 is a view of a possible modification of the feed box.

(2) A meter (FIGURE 7) is constituted of a tubular body 45 of glass or transparent plastic material, having at each of its extremities a thread. This tube 45 screws at its upper part in a base 46 itself intended to receive the cardboard package containing the white or the homogenized yellow 47 (FIGURE 8).

This package is introduced in housing $46_1$.

Gripped between tube 44 and the base are positioned: a joint with a conical lip 47 and a disc of embossed steel sheet $48_1$. This disc has a tubular part whose cutting edge $48_2$ lies in a biased plane relative to the base.

The other end of tube 44 screws into a sleeve 49. Fluid tightness is given by joints 47 and 50. Valve 51 moves down and up along 51a and 51b. Its centring is obtained by sliding of its lower tubular part $51_1$ in the sleeve 49 and by three arms $51_2$ bearing against the inner face of tube 44.

Two conical fluid tight seats $51_3$ and $51_4$ bear alternately against either the conical lip of joint 47 or on sleeve 49.

Packages 47 such as those shown on FIGURE 8, have, set in their lid, a plastic closure 52 whose inner diameter and conical shape correspond to that of tubes 48. This closure 52 is itself closed by a tap 53 secured to the body by a thin film of material.

It will be understood that when such a package is turned over the base of a metering device, and the two are applied firmly one against the other, cutting edge $48_2$ will cut tap 53 thus opening the package and allowing passage of its contents (white or yellow) into the meter. Fluid tightness 48–52 is due to the conical interfitting between these two elements.

If beak $51_1$ is applied against the peak of shells 25, valve 51 frees the lower passage and the liquid can flow through openings $51_5$ with which is provided said beak, while cone $51_3$ closes the opening of joint 47.

Flexibility of the lip of joint 47 makes it possible to apply the meter on the mould without harming the lateral sides.

It should be noted that during a short lapse of time, at the moment when the valve moves, the two upper and lower openings are open. This loss however is of no importance since the same can be taken into account in the metered volume, the speed of the operation being constant.

(3) The machine comprises evidently two meters each receiving its package of distinct product. Each meter has a ribbed arm 54 made fast to a column 55a and 55b. Each of these columns has the possibility of pivoting on itself and to move downwardly along its longitudinal axis. For this purpose, on the one hand, the upper part slides freely in a bore made in the frame of the apparatus, on the other hand, the lower part slides also in a jack 56, while the marker 57, secured to column 55 bears in a helical groove 58 cut in an extension of said jack. This helical groove terminates at its lower end into a vertical rectilinear part, which is not visible in the figure. It is thus seen that columns 55, when they are stressed downwardly, will undergo a turning movement as they lower themselves and then the turning movement will cease to terminate into a rectilinear movement.

In its raised position, such as in the assembly shown on the left, the meter will be located laterally to the machine, while according to the assembly shown on the right, the meter is brought back on the axis of the machine, against the mould and applied thereagainst, the contents of the meter being able then to penetrate within the three shells.

Vertical movement is obtained by the action of water pressure which can come from the city water supply, against the feet of columns 55a and 55b. The water which passes through the joint of sole 59 through opening 60 is admitted to the well of jack 56 through an electro-valve (not shown) and passes through opening 61 and groove 62.

The machine also comprises a programmer having cams each of which acts on an electric contact. The operation of this member will be described below.

The present machine intended more particularly for snack-bars has its shells constantly fed with current and its jack under pressure. The shells are maintained at a given temperature through an energy meter of the stand by type. As soon as the lever controlling the closure of the shells is lowered, the same shuts off the stand by energy meter and puts into operation the second or working energy meter and at the same time feeds current to the programmer.

Through a set of an electrical contact the programmer immediately feeds an electro gate which allows the escape of water contained, for example, under the feet of column 55a. The same thus lowers by pivoting and deposits a quantity of white in the shell mould 25. After a short waiting time, the column goes up and the motor for turning the mould starts for a pre-adjustment time (220 seconds for example). This time elapsed, the motor stops and the pressure of water in the feet of the second column 55b is released. A quantity of yellow is then poured into the mould which already contains its inner envelope of cooked white. The motor starts again after raising of the column to stop 220 seconds later. An alarm then is set off warning personnel that it suffices to raise the previously mentioned lever to open the mould and to obtain a tubular egg product which it is possible to seize on one of the open shells.

Naturally it is possible to change certain details of construction of the present machine. For example it is possible to replace cutting cone $48_2$ by a screw device such that by screwing the neck of the feed package the same be forcibly opened. Similarly it is possible to conceive of turning tubes composed of cylindrical sectors having a variable number different from three. The opening of the tube can take place by other means such as the spacing as petals around a calix. For example an entire sector can be completely removable and the others can be fixed as long as the means for removing these said sectors are balanced to ensure fastening of the tube. The tube itself can be removable.

What is claimed is:

1. Apparatus for preparing a food product from the major constituents of eggs, such as the white and the yolk, in which these constituents are first separated and placed into distinct hoppers which communicate with concentrically-arranged tubular conduits for the purpose of coagulation by heating in which the outer, larger conduit is intended for the white and the inner, smaller conduit for that of the yolk; the improvement which comprises, said outer tubular conduit being made of two parts comprising a metallic portion followed by a second portion of non-metallic material extending downwardly and terminating at the extrusion point, a heating jacket surrounding said metallic portion containing a fluid medium having a temperature sufficient to coagulate the egg white, an inner conduit of a length substantially that of said metallic portion containing the yolk, and dielectric heating means surrounding said non-metallic portion for further solidifying the product passing through said conduits prior to reaching the extrusion point.

2. Apparatus in accordance with claim 1 in which said conduits are vertically arranged, connecting at the top with distinct hoppers.

3. Apparatus in accordance with claim 1 in which a third tubular conduit having the smallest diameter is placed concentrically with said conduits, said third conduit connecting on top with a hopper, for the purpose of introducing a third ingredient as the core in said food product.

4. Apparatus in accordance with claim 1 wherein means are provided at the extrusion point to envelop the finished product in a plastic wrapper.

References Cited

UNITED STATES PATENTS

| | | | |
|---|---|---|---|
| 1,281,592 | 10/1918 | Laskey. | |
| 2,009,238 | 7/1935 | Parsons | 99—243 XR |
| 2,042,940 | 6/1936 | Herron. | |
| 2,208,651 | 7/1940 | Wallace | 99—353 |
| 3,374,728 | 3/1968 | Owens | 99—353 |

WALTER A. SCHEEL, Primary Examiner

A. O. HENDERSON, Assistant Examiner

U.S. Cl. X.R.

99—373, 384, 427; 107—1